(12) United States Patent
Delle Coste

(10) Patent No.: US 10,791,751 B2
(45) Date of Patent: *Oct. 6, 2020

(54) SEALED PACK OF INGREDIENTS FOR AN INDIVIDUAL SMOOTHIE, AND ASSOCIATED METHODS AND APPARATUSES

(71) Applicant: Barfresh Inc., Las Vegas, NV (US)

(72) Inventor: Riccardo Dario Delle Coste, Beverly Hills (AU)

(73) Assignee: BARFRESH INC., Las Vegas, NV (US)

(*) Notice: Subject to any disclaimer, the term of this patent is extended or adjusted under 35 U.S.C. 154(b) by 163 days.

This patent is subject to a terminal disclaimer.

(21) Appl. No.: 16/170,936

(22) Filed: Oct. 25, 2018

(65) Prior Publication Data

US 2019/0059416 A1    Feb. 28, 2019

Related U.S. Application Data

(60) Continuation of application No. 15/894,329, filed on Feb. 12, 2018, now Pat. No. 10,123,552, which is a
(Continued)

(30) Foreign Application Priority Data

| Aug. 17, 2004 | (AU) | ................................ | 2004904676 |
| Feb. 16, 2005 | (AU) | ................................ | 2005902204 |
| Apr. 13, 2005 | (AU) | ................................ | 2005201557 |

(51) Int. Cl.
 *A23G 9/04*   (2006.01)
 *A23G 9/08*   (2006.01)
(Continued)

(52) U.S. Cl.
 CPC ............... *A23G 9/045* (2013.01); *A23G 9/04* (2013.01); *A23G 9/08* (2013.01); *A23G 9/22* (2013.01);
(Continued)

(58) Field of Classification Search
 CPC combination set(s) only.
 See application file for complete search history.

(56) References Cited

U.S. PATENT DOCUMENTS 2,537,915 A    1/1951  Roop
2,863,776 A   12/1958  Lisher
(Continued)

FOREIGN PATENT DOCUMENTS

AU         5388790      11/1990
AU      2005274678       8/2006
(Continued)

OTHER PUBLICATIONS

International Search Report dated Dec. 22, 2005.
(Continued)

*Primary Examiner* — Viren A Thakur
*Assistant Examiner* — Chaim A Smith
(74) *Attorney, Agent, or Firm* — Brinks Gilson & Lione (57) ABSTRACT

A sealed pack (440) contains quantities of ingredients to make an individual smoothie portion. The ingredients comprise a flavour ingredient (410) such as pieces of fruit (strawberries, raspberries, mango), a frozen portion of liquid (420) such as water, fruit juice, milk, coffee or tea; and a consistency ingredient (430) such as ice-cream, sorbet and yoghurt. The pack may be subjected to a temperature sufficiently low to maintain the frozen state of some of the ingredients in the pack (440). Also disclosed is a method of packaging the ingredients into the pack, or into first and second containers, or into a container with compartments for
(Continued)

different ingredients in frozen and unfrozen states; and a method of preparing an individual smoothie using the sealed pack wherein the ingredients are blended with additional liquid; and an apparatus that uses sealed pack for automatically vending an individual smoothie portion.

7 Claims, 6 Drawing Sheets

Related U.S. Application Data continuation of application No. 15/235,898, filed on Aug. 12, 2016, now Pat. No. 9,888,705, which is a division of application No. 11/660,415, filed as application No. PCT/AU2005/001228 on Aug. 16, 2005, now Pat. No. 9,414,614.

(51) Int. Cl.
  A23G 9/22     (2006.01)
  A23G 9/32     (2006.01)
  A23G 9/42     (2006.01)
  A23G 9/52     (2006.01)
  A23L 2/385    (2006.01)
  G07F 9/10     (2006.01)
  G07F 13/06    (2006.01)
  B65D 85/72    (2006.01)

(52) U.S. Cl.
  CPC .............. *A23G 9/32* (2013.01); *A23G 9/42* (2013.01); *A23G 9/52* (2013.01); *A23L 2/385* (2013.01); *B65D 85/72* (2013.01); *G07F 9/105* (2013.01); *G07F 13/065* (2013.01); *A23V 2002/00* (2013.01)

(56) References Cited

U.S. PATENT DOCUMENTS

| | | | |
|---|---|---|---|
| 3,061,443 A | 10/1962 | McLaughlin | |
| 3,647,472 A | 3/1972 | Speech et al. | |
| 3,807,926 A | 4/1974 | Morse | |
| 4,081,560 A | 3/1978 | Ishigaki | |
| 4,233,325 A | 11/1980 | Slangan et al. | |
| 4,794,008 A | 12/1988 | Schmidt et al. | |
| 4,874,614 A | 10/1989 | Seaborne et al. | |
| 4,874,618 A | 10/1989 | Seaborne et al. | |
| 4,899,978 A | 2/1990 | Cederroth et al. | |
| 4,988,529 A | 1/1991 | Nakaya et al. | |
| 5,482,728 A | 1/1996 | Tapfer et al. | |
| 5,486,373 A | 1/1996 | Holt et al. | |
| 5,516,537 A | 5/1996 | Fuisz | |
| 5,698,247 A | 12/1997 | Hall | |
| 5,803,377 A | 9/1998 | Farrell | |
| 5,962,060 A | 10/1999 | Farrell | |
| 5,976,588 A | 11/1999 | Vincent | |
| 6,068,875 A | 5/2000 | Miller et al. | |
| 6,090,426 A | 7/2000 | Vincent | |
| 6,126,983 A | 10/2000 | Miller | |
| 6,156,357 A | 12/2000 | Franklin | |
| 6,176,090 B1 | 1/2001 | Ufema | |
| 6,242,037 B1 | 6/2001 | Vincent | |
| 6,258,394 B1 | 7/2001 | Hochstein et al. | |
| 6,273,292 B1 | 8/2001 | Milan | |
| 6,399,134 B1 | 6/2002 | Best et al. | |
| 6,458,402 B1 | 10/2002 | Chang | |
| 6,465,034 B2 | 10/2002 | Farrell | |
| 6,511,693 B2 | 1/2003 | Jones | |
| 6,548,097 B1 | 4/2003 | Beat et al. | |
| 6,772,675 B2 | 8/2004 | Ervin | |
| 6,896,923 B2 | 5/2005 | Ghaffari et al. | |
| 6,955,829 B2 | 10/2005 | Binley et al. | |
| 7,074,452 B2 | 7/2006 | Lebowitz | |
| 2002/0044997 A1 | 4/2002 | Farrell | |
| 2002/0048626 A1 | 4/2002 | Miller | |
| 2002/0080678 A1 | 6/2002 | Daniels, Jr. | |
| 2002/0098268 A1 | 7/2002 | Cohen et al. | |
| 2002/0127307 A1 | 9/2002 | McGill | |

FOREIGN PATENT DOCUMENTS

| | | | |
|---|---|---|---|
| DE | 3219804 A1 | 3/1983 | |
| DE | 3117940 A1 | 8/1983 | |
| GB | 1050213 | 12/1966 | |
| GB | 1124335 | 8/1968 | |
| GB | 2 255 704 | 11/1992 | |
| GB | 2381517 | 5/2003 | |
| GB | 2381517 A | 5/2003 | |
| JP | 60 66962 | 4/1985 | |
| JP | 2003024021 A | 2/2003 | |
| JP | 2004129596 A2 | 4/2004 | |
| JP | 2004149596 A1 | 5/2004 | |
| JP | 2004173645 A2 | 6/2004 | |
| JP | 2004173646 A2 | 6/2004 | |
| JP | 2004173651 A2 | 6/2004 | |
| JP | 2004-180508 | 7/2004 | |
| JP | 2004-180508 A | 7/2004 | |
| MY | P120053851 | 8/2006 | |
| NL | 1009209 C | 11/1999 | |
| RU | 195733 | 5/1967 | |
| RU | 1761090 A1 | 9/1992 | |
| TH | 10337 | 8/2006 | |
| WO | WO 01/60184 | 8/2001 | |
| WO | WO 0238011 A2 | 5/2002 | |
| WO | WO 2004/091305 A1 | 10/2004 | |

OTHER PUBLICATIONS

International Preliminary Report dated Mar. 16, 2006.
Statement of Grounds and Particulars in opposition of Australian Patent Application No. 2005274678, dated Jun. 18, 2007.
Official Action dated Aug. 16, 2005 from corresponding Russian Patent Application 2007109792 with English Translation.
Extended European Search Report for European application No. 05773978.1 dated Dec. 6, 2010, 6 pages.
Office Action listed in Chinese patent application No. 200580033724.5 dated May 8, 2009, and English translation, 7 pages.
Official Action issued in Israeli patent application No. 2007IL-0181335 including an excerpt from cited reference US 2002127307, dated Jun. 16, 2010, 4 pages.
Official Action issued in Japanese patent application No. JP 2007-526119, dated May 10, 2011, with Translation of "Notice of Reasons for Rejection," 5 pages.
Office Action issued in Israeli patent application No. 181335, dated Jun. 9, 2010, 4 pages.
Office Action issued in Indonesian patent application No. W-00200700882, dated Nov. 17, 2011, and accompanying letter dated Dec. 1, 2011, from patent counsel explaining contents of the Office Action, 3 pages.
English translation of an Office Action issued in Japanese patent application No. 2007-526119, dated Nov. 29, 2011, 3 pages.
Office Action issued in Canadian patent application No. 2,577,163, dated May 9, 2012, 2 pages.
Communication Pursuant to Article 94(3) EPC, issued by the European Patent Office in European patent application No. 05 773 978.1-2114, dated Oct. 16, 2012, 5 pages.
Anonymous, "Juicers and Smoothies Drink Mixes," MINTEL Jun. 1999, retrieved from www.gnpd.com, database accession No. 10060135, 2 pages.
Anonymous, "Smoothie Mix," MINTEL, Jul. 1999, retrieved from www.gnpd.com, database accession No. 10060700, 1 page.
Anonymous, "All Natural Smoothie Fruit Mix," MINTEL Jul. 2004, retrieved from www.gnpd.com, database accession No. 10178227, 2 pages.
Summons to Attend Oral Proceedings from corresponding European patent application No. 05773978.1-1358, 4pgs., Jan. 29, 2015.

(56) References Cited

OTHER PUBLICATIONS

Brazilian Examination Report from corresponding Brazilian Application No. PI0514480-9, 3pgs., dated Jul. 31, 2017.

Fig. 6

# SEALED PACK OF INGREDIENTS FOR AN INDIVIDUAL SMOOTHIE, AND ASSOCIATED METHODS AND APPARATUSES

RELATED APPLICATIONS

The present patent document is a continuation of U.S. patent application Ser. No. 15/894,329, filed Feb. 12, 2018, pending, to issue on Nov. 13, 2018 as U.S. Pat. No. 10,123,522, which is a continuation of U.S. patent application Ser. No. 15/235,898, filed Aug. 12, 2016, granted as U.S. Pat. No. 9,888,705 on Feb. 13, 2018, which is a division of U.S. patent application serial No. 11/660,415, filed Aug. 16, 2005, granted as U.S. Pat. No. 9,414,614 on Aug. 16, 2016, which is a national stage entry of PCT application number PCT/AU05/001228, designating the United States and published in English, which claims the benefit of priority to Australian patent application number 2004904676, filed Aug. 17, 2004, Australian patent application number 2005902204, filed Feb. 16, 2005, and Australian patent application number 2005201557, filed Apr. 13, 2005, the entire contents of which applications are incorporated herein by reference.

FIELD OF THE INVENTION

The present invention relates to packaging of ingredients for preparing compositions and methods for preparing compositions using pre-packed ingredients.

BACKGROUND

Five years ago, juice bars were the domain of grocers disposing of excess fruit, or health-food stores. However, juice bars have more recently become a significant part of the fast-food market and have begun to proliferate as franchises or independent enterprises. A key product of juice bars is the smoothie, which is a thick, smooth (in texture) drink generally comprising fruit pieces pureed or blended with ice-cream, sorbet or yoghurt and/or milk or juice. Non-fruit smoothies include alternative flavour ingredients to fruit such as chocolate, coffee, alcohol, etc. Other items may also be added such as energy-boosting supplements, muesli, proteins, raw eggs, etc.

Figure 1:
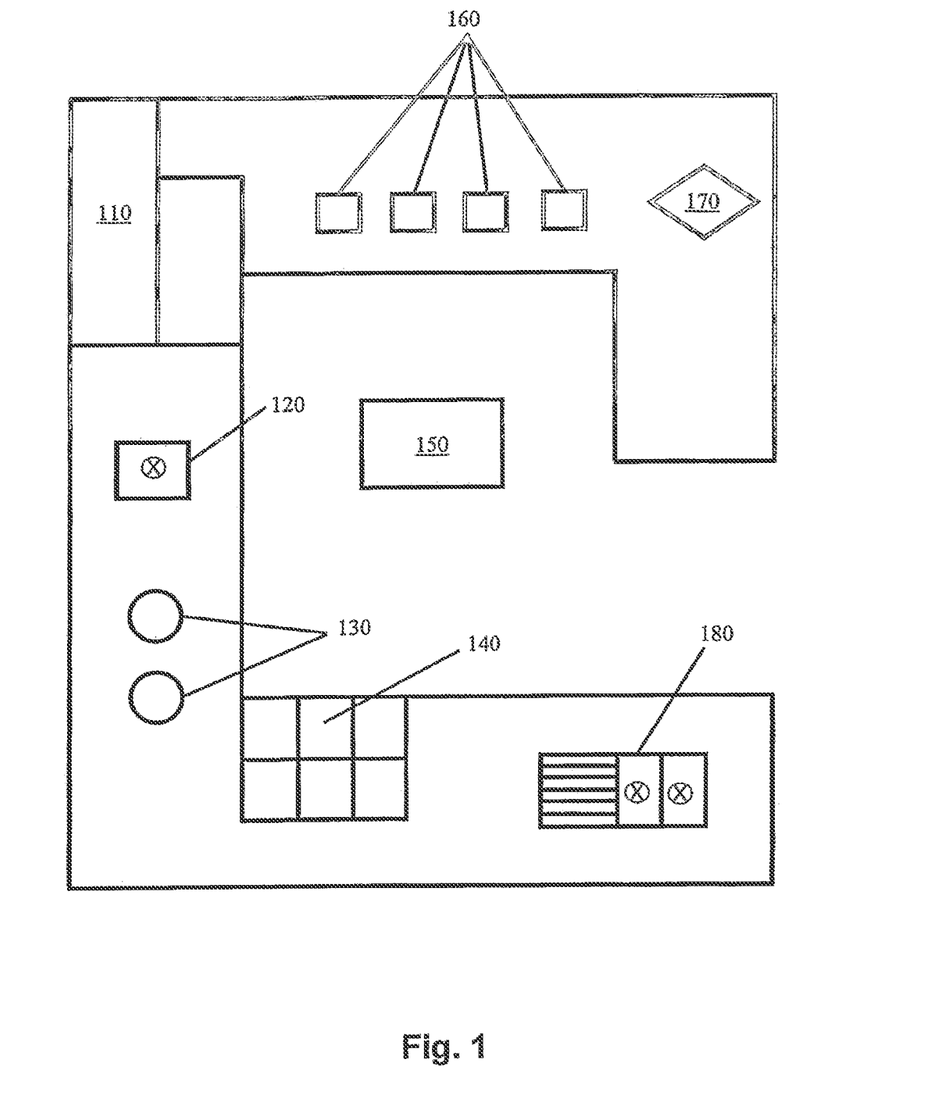
FIG. 1 is a plan view of a layout of a conventional juice bar.

FIG. 1 is a plan view of a layout of a conventional juice bar. Display counter 110 enables display of fresh fruit that is used in the preparation of smoothies and other juice bar products. A sink 120 is used to prepare the fresh fruit, which may be processed in the juicers 130. A freezer 140 is used to store items such as ice, ice-cream and yoghurt. A chiller/dispenser 150 is used to refrigerate liquid ingredients of smoothies and/or other juice bar products. A row of blenders 160 are used to blend the ingredients of smoothies and/or other juice bar products, which are subsequently dispensed into cups for delivery to customers. The customers pay at the till 170. Used blending containers are cleaned for reuse at the sink 180. Automatic dishwashing equipment may also be used, which may be installed under counter.

A juice bar such as that shown in FIG. 1 is typically operated by three to six operators. Preparation of a smoothie typically entails the steps of retrieving a clean container for blending, obtaining appropriate quantities of ingredients such as fruit, yoghurt and ice from respective storage areas in the juice bar, blending the smoothie, dispensing the smoothie into a cup and handing the smoothie to the respective customer. In preparing a smoothie, an operator is thus required to move around the juice bar. Although juice bars are generally laid out in accordance with workflow requirements, a substantial amount of movement by operators is unavoidable. This consumes time and limits the number of operators that can simultaneously prepare products such as smoothies.

A need thus exists for improved methods of supplying and preparing compositions such as smoothies.

BRIEF SUMMARY

Aspects of the present invention provide apparatuses, methods and packaging for preparing compositions.

According to one aspect of the present invention, there is provided a method for packaging ingredients for preparing an individual portion of a composition. The method comprises the steps of storing at least one ingredient for the composition in a first container and storing the remaining ingredients for the composition in a second container. One or more of the remaining ingredients are frozen. The contents of the first container preferably remain unfrozen, even when the first and second containers are simultaneously subjected to a temperature sufficiently low to freeze the content of the second container. The contents of the first container may comprise a liquid base for the composition and may further comprise an agent that prevents freezing of the contents bf the first container.

According to another aspect of the present invention, there is provided a method for packaging ingredients for preparing a composition. The method comprises the steps of storing at least one ingredient for the composition in a first container, storing other ingredients for the composition in a second container and simultaneously subjecting the first and second containers to a temperature sufficiently low to freeze the content of the second container. The composition may comprise a smoothie and the at least one ingredient may comprise a liquid base for the smoothie.

According to another aspect of the present invention, there is provided a pre-packed pack containing ingredients for preparing an individual portion of a composition. The pack comprises a plurality of compartments for storing different ones of the ingredients, wherein the content of at least one of the compartments is frozen and the content of at least another one of the compartments remains unfrozen. The pre-packed pack may be subjected to a temperature sufficiently low to freeze the content of at least one of the compartments. The contents of the at least one compartment that remains unfrozen may comprise a liquid base and an agent that prevents freezing of the liquid base.

According to a further aspect of the present invention, there is provided a method for preparing a composition comprising the steps of transferring contents of a pre-packed pack to a container and blending the contents in the container. The pack comprises a plurality of compartments containing different ingredients of the composition. The contents of at least one of the compartments are frozen and the contents of at least another one of the compartments are unfrozen. The contents of the at least one compartment that remains unfrozen may comprise an agent that prevents freezing of the contents of the at least one compartment. The content of the at least one compartment that remains unfrozen may comprise a liquid base for preparing the composition. The composition may comprise a smoothie and the pack may comprise ingredients for preparing a single smoothie portion.

Another aspect of the present invention provides a method for storing ingredients for preparing an individual portion of a smoothie. The method comprises the steps of placing a flavour ingredient into a pack, placing into the pack a frozen portion of liquid, placing into the pack at least one additional consistency ingredient and subjecting the pack to a temperature sufficiently low to maintain the frozen state of at least certain of the ingredients of the pack. The quantities of the ingredients in the sealed pack are based on a target quantity of an individual smoothie portion.

Yet another aspect of the present invention provides a sealed pack containing ingredients for preparing an individual portion of a smoothie. The pack comprises a flavour ingredient, a frozen portion of liquid and at least one additional consistency ingredient. The quantities of the ingredients in the sealed pack are determined based on a target quantity of an individual smoothie portion.

Still another aspect of the present invention provides a method for preparing an individual portion of a smoothie comprising the steps of transferring contents of a sealed pack to a container, adding a portion of liquid to the container and blending the contents of the container. The contents of the sealed pack comprise a flavour ingredient, a frozen portion of liquid and at least one additional consistency ingredient. The quantities of the contents of the sealed pack are based on a target quantity of an individual smoothie portion.

Another aspect of the present invention provides an apparatus for automatically vending individual smoothie portions. The apparatus comprises first dispensing means for dispensing the contents of a sealed pack into a container, second dispensing means for dispensing a portion of liquid into the container, blending means for blending the contents of the container and vending means for vending the contents of the container as an individual smoothie portion. The contents of the sealed pack comprise a flavour s ingredient, a frozen portion of liquid and at least one additional consistency ingredient. The quantities of the contents of the sealed pack are based on a target quantity of an individual smoothie portion.

Still another aspect of the present invention provides an apparatus for automatically vending individual smoothie portions. The apparatus comprises first dispensing means for dispensing ingredients for a smoothie into a container, second dispensing means for dispensing a portion of liquid into the container, blending means for blending the contents of the container and vending means for vending a portion of the contents of the container as an individual smoothie portion. The ingredients comprise a flavour ingredient, a frozen portion of liquid and at least one additional consistency ingredient.

BRIEF DESCRIPTION OF THE DRAWINGS

A small number of embodiments are described hereinafter, by way of example only, with reference to the accompanying drawings in which.

DETAILED DESCRIPTION OF THE PRESENTLY PREFERRED EMBODIMENTS

Embodiments of methods and packaging for preparing compositions are described hereinafter. Although the embodiments are particularly described with reference to smoothies, it is not intended that the present invention be restricted in this way. Specifically, the present invention has application to other types of compositions and particularly to other compositions for human consumption, such as soups.

Use of the term 'smoothie' in the present document is intended to include fruit-based smoothies and non-fruit-based smoothies, which may include flavour ingredients such as coffee, chocolate and alcohol. Furthermore, smoothies may be dairy-based or non-dairy-based.

Use of the term 'unfrozen' in the present document is intended to mean 'not completely frozen' and to include 'partially frozen', 'slushy' and 'icy' within the scope of the intended meaning. Use of the term 'partially frozen' in the present document is intended to mean 'not completely frozen' and to include 'slushy' and 'icy' within the scope of the intended meaning.

Use of the phrase 'an individual portion', in the present document is intended to mean a portion suitable for consumption by one person or individual. However, such portions may vary in size or volume to cater for different individuals (e.g.; adults and children or small, medium and large).

Figure 2:
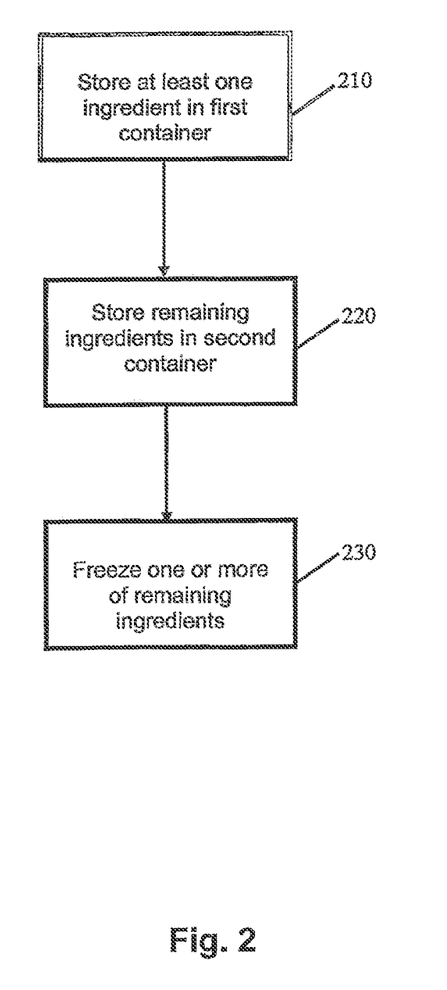
FIG. 2 shows a flow diagram of a method for packaging ingredients for preparing a composition such as a smoothie.

FIG. 2 shows a flow diagram of a method for packaging ingredients for preparing a composition such as a smoothie. At step 210, at least one ingredient for the composition is stored in a first container. At step 220, remaining ingredients for preparing the composition are stored in a second container. One or more of the remaining ingredients in the second container may be frozen at step 230. In some cases, already frozen ingredients are stored in the second container and step 230 may serve to maintain such in a frozen state.

For making a smoothie, the contents of the first container comprise a liquid base such as apple juice concentrate or mango nectar, which is maintained in an unfrozen state. Prevention of freezing of the liquid base advantageously yields an improved texture of the prepared smoothie in comparison to use of a frozen base. If two smoothies with identical ingredients, apart from the one smoothie's juice base being liquid and the other smoothie's juice base being frozen, are blended in identical blenders, the smoothie with the liquid base will have a smoother or more liquid texture than the smoothie with the frozen base. The contents of the second container comprise the remaining ingredients for preparing the smoothie such as frozen yoghurt, individually quick frozen (IQF) fruit and ice flakes. The IQF fruit may, for example, comprise whole strawberries, raspberries, boysenberries and mango chunks.

In one embodiment, the first and second containers comprise separate compartments of a single package containing ingredients for preparing a single portion of a smoothie. In this instance, the entire package is subjected to a sufficiently low temperature to ensure that the contents of the second compartment are frozen. However, the liquid contents of the first compartment are prevented from freezing. One method used to prevent freezing is the addition of an 'anti-freeze' additive to the liquid base content. Another method of preventing freezing is use of a thermally insulating material for the first compartment. The methods may be employed separately or in combination.

In an alternative embodiment, the first and second containers comprise separate packs. Accordingly, a number of first containers may be packed in a larger container (for example, plastic bottles in a cardboard box or plastic crate) for ease of handling and delivery to juice bars. A number of the second containers may similarly be consolidated in a larger container, with the larger container being subjected to sufficiently low temperatures to freeze the contents of the number of second containers.

Three examples of ingredient lists for fruit smoothies that may be packaged and/or prepared according to the methods described herein are provided hereinafter:

Mixed Berry Fruit Smoothie
1. Apple juice concentrate (liquid form): 200 ml
2. Strawberry-flavoured frozen yoghurt: 180 ml
3. Strawberries (IQF): 2 whole berries@11 g each=22 g
4. Raspberries (IQF): 2 whole berries@2 g each=4 g
5. Ice flakes: 0.75 cup Mango Fruit Smoothie
1. Mango nectar (liquid form): 150 ml
2. Mango pieces (frozen): 3 pieces@6 g each=18 g
3. Mango-flavoured frozen yoghurt: 180 ml
4. Ice flakes: 0.75 cup Tropical Fruit Smoothie
1. Tropical juice (liquid form): 200 ml
2. Mango-flavoured frozen yoghurt: 180 ml
3. Mango pieces (frozen): 1 piece@6 g each=6 g
4. Strawberries (IQF): 1 whole berry@11 g each=11 g
5. Raspberries (IQF): 2 whole berries@2 g each=4 g
6. Ice flakes: 0.5 cup Individually frozen fruit avoids the need for pre-blended fruit mix, which contributes to the texture and freshness of the smoothies.

Figure 3:
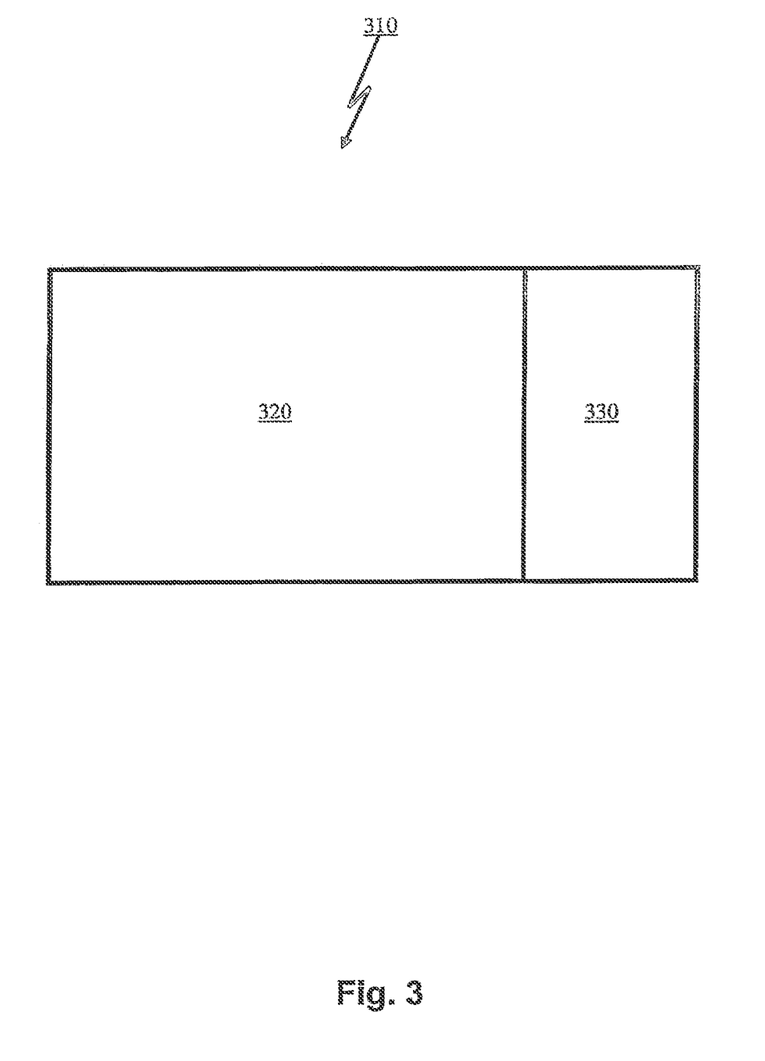
FIG. 3 shows a pre-mix pack for preparing an individual portion of a composition such as a smoothie.

FIG. 3 shows a pre-mix pack for preparing an individual smoothie. The pack 310 comprises two separate compartments 320 and 330 for storing frozen and non-frozen ingredients, respectively. The pre-mix pack may be constructed from flexible plastic material. Thermal insulation may be provided by a metallic deposition on the plastic material.

Figure 4:
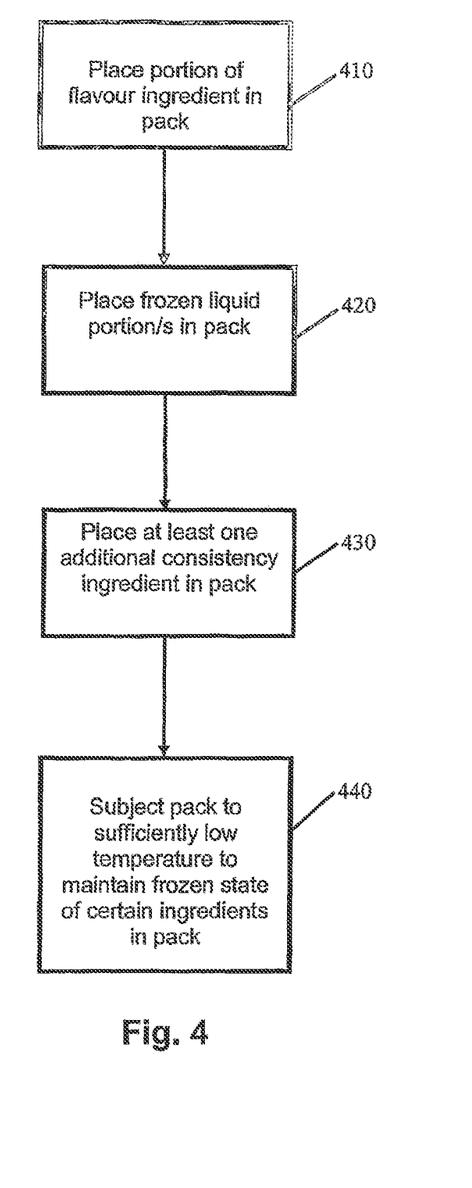
FIG. 4 shows a flow diagram of a method for storing ingredients for preparing an individual portion of a smoothie.

FIG. 4 shows a flow diagram of a method for storing ingredients for preparing an individual portion of a smoothie. At step 410, a flavour ingredient is placed in a pack. The flavour ingredient may, for example, comprise fruit, chocolate, coffee, alcohol, etc. For the case of fruit, individually frozen pieces of fruit may be used for ease of preparing the pack and/or to assist later blending of the contents of the pack. However, a portion of fruit in another form such as puree may alternatively be used. Fresh fruit may also be used, although this would disadvantageously have a relatively shorter lifespan. At step 420, a frozen portion of liquid is placed in the pack. The frozen liquid portion may, for example, comprise multiple, small, individually frozen portions of water (ice), fruit juice, milk, tea and/or coffee. This contributes to improved consistency and texture of the smoothie and assists in preventing damage to or reducing wear of the blender while blending the contents of the pack. In certain embodiments, the frozen liquid portion comprises multiple hollow frozen portions (e.g., hollow ice cubes). If not hollow, it is preferable that the frozen liquid portions are of a smaller size to assist in preventing damage to the blender. At step 430, at least one additional consistency ingredient is placed in the pack. The at least one additional consistency ingredient contributes to the texture or runniness of the smoothie and may, for example, comprise ice-cream, sorbet and/or yoghurt. The quantities of the ingredients in the sealed pack are determined based on a target quantity of an individual smoothie portion. The pack is subjected to a temperature that is sufficiently low to maintain the frozen state of at least certain of the contents of the pack, at step 440. Other ingredients such as energy-boosting supplements, muesli, proteins, raw eggs, etc., may also be added to the smoothie.

Figure 5:
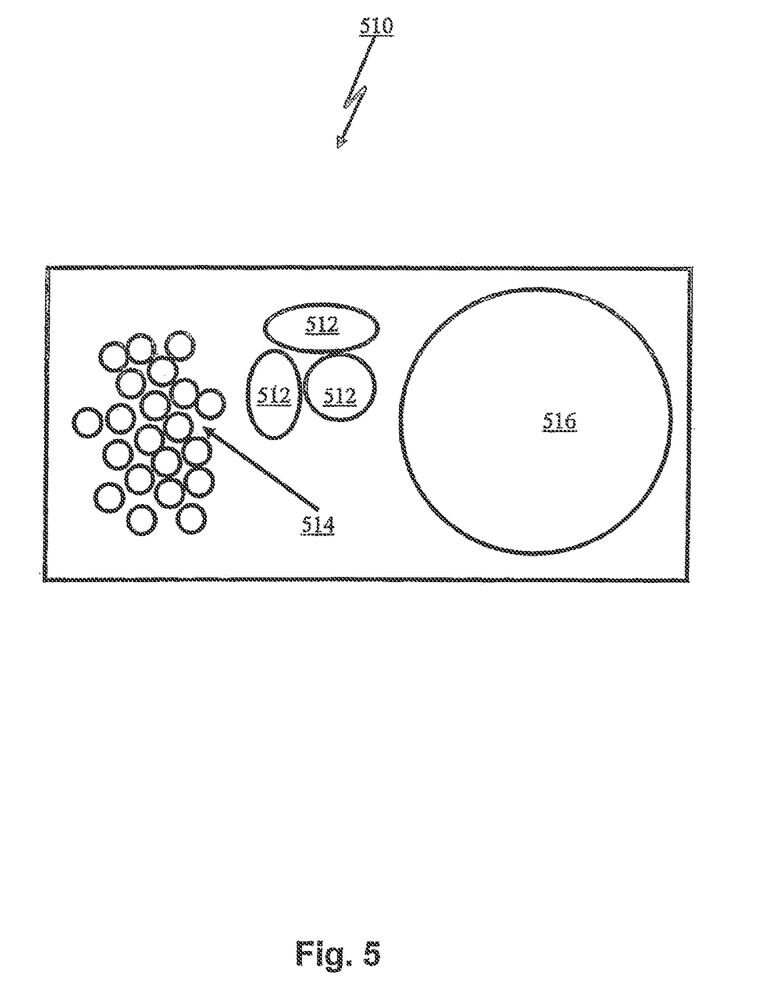
FIG. 5 shows a sealed pack of ingredients for preparing an individual portion of a smoothie.

FIG. 5 shows a sealed pack of ingredients for preparing an individual portion of a smoothie. The sealed pack 510 comprises portions of fruit 512, frozen portions of liquid 514 and at least one additional consistency ingredient 516. Individually frozen pieces of fruit may be used to assist later blending of the contents of the pack. However, a portion of fruit in another form such as puree may alternatively be used. Fresh fruit may also be used, although this would disadvantageously have a relatively shorter lifespan. Other flavour ingredients such as coffee, chocolate, alcohol, etc. may alternatively be used in place of fruit. The frozen liquid portions 514 preferably comprise multiple, small, individually frozen portions of water (ice), fruit juice, milk, tea and/or coffee. This contributes to improved consistency and texture of the smoothie and assists in preventing damage while blending the contents of the pack. In certain embodiments, the multiple frozen liquid portions 514 are hollow (e.g., hollow ice cubes). If not hollow, it is preferable that the frozen liquid portions 514 are of a smaller size to assist in preventing damage to or reducing wear of the blender. The at least one additional consistency ingredient 516 contributes to the texture or runniness of the smoothie and may, for example, comprise ice-cream, sorbet and/or yoghurt. The quantities of the ingredients in the sealed pack are typically determined based on a target quantity of an individual smoothie portion. The pack 510 typically comprises a sealable or re-sealable disposable container such as a plastic bag or a plastic cup. Other ingredients such as energy-boosting supplements, muesli, proteins, raw eggs, etc., may also be added to the smoothie.

Figure 6:
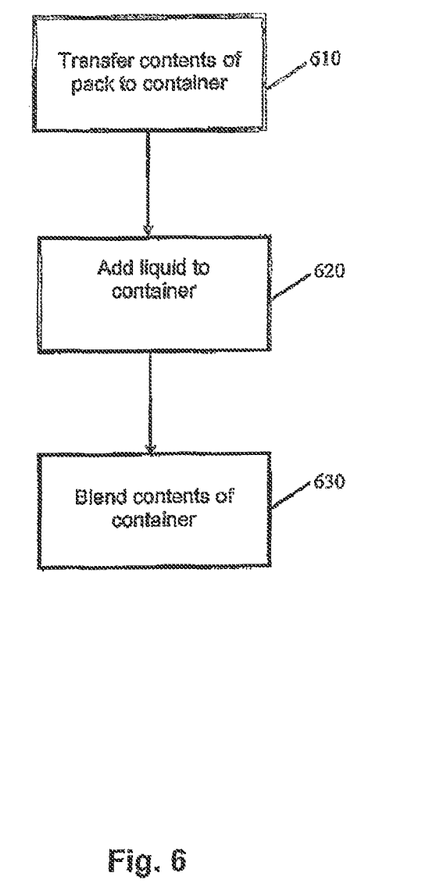
FIG. 6 shows a flow diagram of a method for preparing an individual portion of a smoothie.

FIG. 6 shows a flow diagram of a method for preparing an individual portion of a smoothie. At step 610, the contents of a sealed pack are transferred to a container for blending. Contents of the pack comprise a flavour ingredient, a frozen portion of liquid and at least one additional consistency ingredient, which contributes to the texture or runniness of the smoothie and may, for example, comprise ice-cream, sorbet and/or yoghurt. The flavour ingredient may comprise a portion of fruit in the case of a fruit smoothie. The frozen liquid portions preferably comprise multiple, small, individually frozen portions of water (ice), fruit juice, milk, coffee and/or tea. This contributes to improved consistency and texture of the smoothie and assists in preventing damage while blending the contents of the pack. In certain embodiments, the multiple frozen liquid portions are hollow (e.g., hollow ice cubes). If not hollow, it is preferable that the frozen liquid portions are of a smaller size to assist in preventing damage to or reducing wear of the blender. Individually frozen pieces of fruit are preferably used to assist later blending of the contents of the pack. However, a portion of fruit in another form such as puree may, alternatively be used. Fresh fruit may also be used, although this would disadvantageously have a relatively shorter [useful] lifespan. The quantities of the contents in the sealed pack are typically determined based on a target quantity of an individual smoothie portion. A portion of liquid is added to the container at step 620 and the contents of the container are blended at step 630. Presence of liquid is necessary for the blending process. The liquid may, for example, comprise water, fruit juice, milk, tea and/or coffee. Other ingredients such as energy-boosting supplements, muesli, proteins, raw eggs, etc., may also be added to the smoothie.

In certain embodiments, a vending machine is used to blend and vend single portions of smoothies, as described hereinbefore. Certain or all of the ingredients may be stored or pre-packed in individual portions or serves in the vending machine as described hereinbefore. Alternatively, certain or all of the ingredients may be stored in bulk in the vending machine and be dispensed in appropriate quantities for preparing single smoothie portions. For example, a vending machine may store packs such as those described in relation to and shown in FIG. 5 for blending with an amount of liquid dispensed from a bulk tank, which may be located internally or externally to the vending machine. The liquid may, for example, comprise water, fruit juice, milk, tea and/or coffee. Other ingredients such as energy-boosting supplements, muesli, proteins, raw eggs, etc., may also be added to the smoothies. The vending machine thus provides automatic blending and dispensing of individual smoothie portions.

Methods and packaging for smoothies and other compositions have been described hereinbefore. Such methods and packaging are advantageous in that they can ensure exact portioning and thus provide improved consistency and quality control at the point of manufacture and sale. Pre-packed ingredients for producing individual smoothie portions are designed to suitably fill standard cup sizes used by a juice bar or vendor and wastage can thus be reduced or eliminated. Packaging of individual smoothie portions also advantageously results in less labour and real estate being required at the point of manufacture and sale. This translates to less staff and smaller juice bars and, consequently, lower operating costs. Moreover, purchase of all or most of the ingredients in a single package will likely result in savings throughout the entire supply chain. Packaging of individual smoothie portions also advantageously enables quicker preparation of smoothies, thus permitting increased productivity and increased customer satisfaction.

The foregoing detailed description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

Where specific features, elements and steps referred to herein have known equivalents in the art to which the invention relates, such known equivalents are deemed to be incorporated herein as if individually set forth. Furthermore, features, elements and steps referred to in respect of particular embodiments may optionally form part of any of the other embodiments unless stated to the contrary.

Embodiments of the invention have application beyond juice bars. For example, methods and packaging for preparing compositions described hereinbefore may be used in various retail outlets such as supermarkets, various food providers such as restaurants, cafes, and coffee shops and private homes.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method for preparing an individual portion of a smoothie, the method comprising steps of:
    transferring contents of a sealed pack to a container, the contents of the sealed pack comprising
        a flavour ingredient, the flavour ingredient selected of a quantity suitable for the individual portion of the smoothie and of a quantity to suitably fill a cup of a standard cup size when served to a consumer;
        a frozen ingredient of an amount selected to produce the individual portion of the smoothie when combined with the quantity of the flavour ingredient, the frozen ingredient comprising a plurality of frozen individual pieces sized to contribute through blending to predetermined product consistency of the individual portion of the smoothie; and
        at least one consistency ingredient in an amount to produce the individual portion of a smoothie when combined with the amount of the flavour ingredient and the amount of the frozen ingredient, when served, the at least one consistency ingredient selected to consistently produce single-serving smoothies including the individual portion of the smoothie with a predetermined texture or runniness following blending of the at least one consistency ingredient with the flavour ingredient, the frozen ingredient, and a predetermined portion of liquid;
    adding the predetermined portion of liquid to the container; and
    blending the contents of the container.

2. The method of claim 1 wherein transferring contents of a sealed pack to a container comprises transferring as the frozen ingredient a plurality of frozen portions of at least one liquid selected from a group of liquids consisting of water, fruit juice, milk, coffee and tea.

3. The method of claim 1 wherein transferring contents of a sealed pack to a container comprises transferring as the flavour ingredient a portion of fruit.

4. The method of claim 3 wherein transferring as the flavour ingredient a portion of fruit comprises transferring into the container a plurality of individually frozen pieces of fruit.

5. The method of claim 4 wherein transferring into the container a plurality of individually frozen pieces of fruit comprises transferring into the container a plurality of individually frozen pieces of fruit selected to have a size suitable to assist in the blending of the portion of fruit by a blender with the flavour ingredient and the frozen ingredient to produce the individual smoothie portion at the predetermined product consistency.

6. The method of claim 1 wherein transferring contents of a sealed pack to a container comprises transferring as the at least one consistency ingredient an ingredient selected from a group of ingredients consisting of ice-cream, sorbet and yoghurt.

7. The method of claim 1 wherein transferring contents of a sealed pack to a container comprises transferring as the frozen ingredient at least one of frozen water, frozen fruit juice or frozen pieces of fruit.

* * * * *